Aug. 22, 1933.  A. O. AUSTIN  1,923,564
CONDENSER LIGHTNING PROTECTION DEVICE
Filed Dec. 3, 1929   2 Sheets-Sheet 1

INVENTOR
Arthur O. Austin
BY
ATTORNEY

Patented Aug. 22, 1933

1,923,564

UNITED STATES PATENT OFFICE 1,923,564

CONDENSER LIGHTNING PROTECTION DEVICE

Arthur O. Austin, near Barberton, Ohio, assignor, by mesne assignments, to The Ohio Brass Company, Mansfield, Ohio, a Corporation of New Jersey Application December 3, 1929. Serial No. 411,290

4 Claims. (Cl. 175—30)

This invention relates to devices for protecting apparatus from lightning or other disturbances which may be produced in a transmission line or system.

One object of the invention is to provide a protection device of the class named which will dissipate the energy of abnormal disturbances on the line to prevent damage to apparatus connected to the line or break-down of the insulation and flash over to ground.

Another object is to provide a protection device comprising a condenser in which the potential of the two conductor elements is graded to subject the dielectric element to a potential difference less than the potential difference between the conductors connected to said conductor elements.

Another object of the invention is to provide a protection device which may be maintained in series with the protected apparatus without producing serious loss of energy at normal voltages.

Another object of the invention is to provide a protection device which shall be economical to manufacture, simple in structure and efficient in operation.

Other objects and advantages will appear from the following description.

The invention is exemplified in the combination and arrangement of parts shown in the accompanying drawings and described in the following specification, and it is more particularly pointed out in the appended claims.

In connecting up small transformers or other electrical apparatus of relatively small size, considerable difficulty has been experienced in insuring a high degree of protection from lightning or other electrical surges, particularly if the equipment is built for comparatively low working voltages.

Lightning is as severe on a low voltage line as on a high voltage line, the magnitude of the voltage usually being limited only by the brakedown at some point in the insulation of the line. Since low voltage lines are not so highly insulated as high voltage lines, surges on the low voltage lines are usually not so high as on the high voltage lines. On low voltage lines, however, owing to the relatively high voltage of the surge compared to the operating voltage of the apparatus, it is practically impossible to provide the necessary insulation in the apparatus itself to withstand induced surges without unduly increasing the cost of the apparatus. It is therefore especially important to provide lightning or surge protection for apparatus used in connection with low voltage lines.

It has been the general practice heretofore to connect a lightning arrester of some type in multiple with the apparatus. This arrangement frequently forms only partial protection as the time lag in the arrester or its inability to discharge heavy surges permits a serious rise of voltage in the apparatus which may destroy the apparatus. In the present invention, however, the protective device is placed between the line and the apparatus to be protected, so that before any disturbance can reach the protected apparatus, it must first pass through the protective device. In other words, the protective device is in series with the apparatus to be protected rather than in multiple with it.

This arrangement has the disadvantage that there is a small power loss in the protective device. To offset this loss, a much higher degree of protection is obtained, a lower cost is required for the protective device, and means is produced for damping out high frequency disturbances so that the protected apparatus is subjected to such disturbance for the shortest period of time possible. In addition, the effect of time lag in the operation of the arrester is eliminated. Since the arrester has no gap to form an arcing ground, it does not set up a surge on the system due to the striking of an arc across a gap. By properly proportioning the resistance in the arrester to the resistance of the protected apparatus, the power loss under normal operation will be reduced to a relatively small quantity and, at the same time, a comparatively small arrester will provide a large amount of protection.

Figure 1:
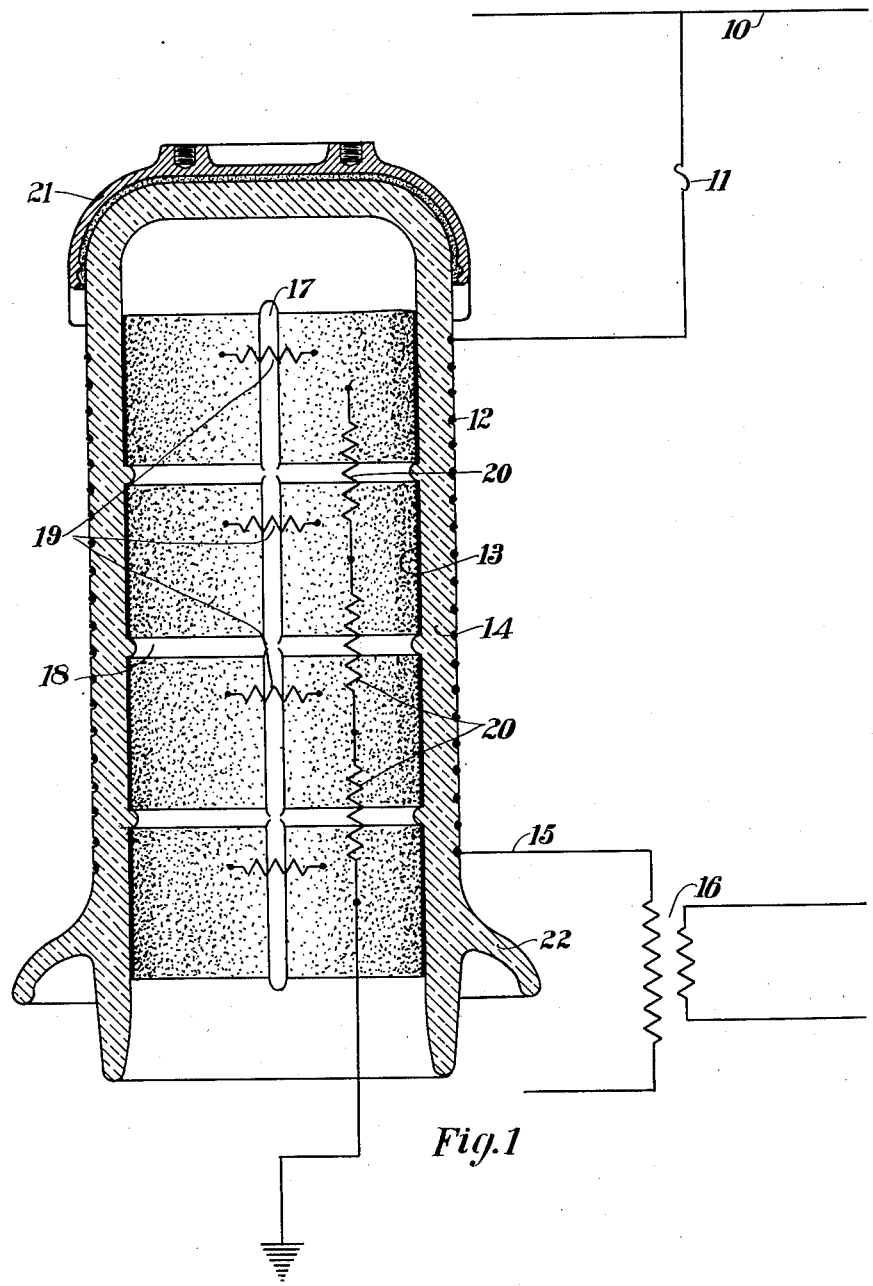
Fig. 1 is a vertical, sectional view of a protection device illustrating one embodiment of the present invention.

In the embodiment of the invention shown in Fig. 1, a transmission line 10 is connected to the arrester by a fuse or circuit breaker 11. The arrester comprises a resistance winding 12 which forms an electrostatic condenser with the inner lining 13 of the arrester. The two conductor elements of the condenser are separated by a dielectric wall 14 which forms a hollow cylinder, closed at the top and open at the bottom. The cylinder 14 provides sufficient insulation to prevent breakdown between the two elements of the condenser for all voltages to which the arrester will be subjected in operation. One end or a tap 15 of the resistance winding 12 is connected to a transformer 16 or other translating device forming the load to be protected. The inner coating 13 of condenser is connected to ground. In some cases, it may be advisable to employ a number of units together to provide a high degree of protection and, at the same time, permit use of the device on circuits where the normal power current is relatively large.

The condenser connected to one side of the power circuit only is shown, the connection to the other side being similar. A resistance 12 may be wound inductively or non-inductively on the dielectric member 14. A high frequency surge impressed on the line will cause current to flow on the resistance 12. Because of the high frequency of such disturbances, a large portion of the current produced thereby will go through the condenser formed by the elements 12, 13 and 14 to ground; the amount of current thus diverted depending upon the voltage impressed, the frequency and the capacitance of the condenser. There will be a material drop in voltage along the conductor 12 due to the resistance of the conductor and the action of the condenser formed by the elements 12, 13 and 14. Since energy will be diverted by the condenser throughout the length of the winding 12, the amount of current flowing in the winding will be greatest at the end of the winding next the transmission line, and least at the end of the winding next the transformer, and correspondingly, the voltage between the winding 12 and ground will be greatest at the line side of the apparatus and least at the load side. This is desirable as it increases the flow of current into the section of the condenser nearest the line without subjecting the transformer to this high voltage.

The inner metallic lining 13 is divided into sections by longitudinal ribs 17 on the inner surface of the dielectric member 14 and by circumferential ribs 18 on the inner surface of the dielectric member. The space between the sections is bridged by resistance conductors 19 and 20. A considerable amount of the energy of the abnormal surges will be dissipated by these resistance connections due to the currents set up by the winding 12 when subjected to high voltage disturbances.

The dielectric member may be supported by means of a metallic cap or fitting 21 secured to the upper end of the member and the lower end is made to project sufficiently beyond the winding 12 and the lining 13 to prevent flashover between the two condenser elements. A flange 22 may be provided below the lower end of the winding 12 to further insure against discharge about the lower end of the dielectric member. This flange will act as a water shed and keep the surface beneath the shed dry so as to prevent danger of flashover during a rain.

Figure 2:
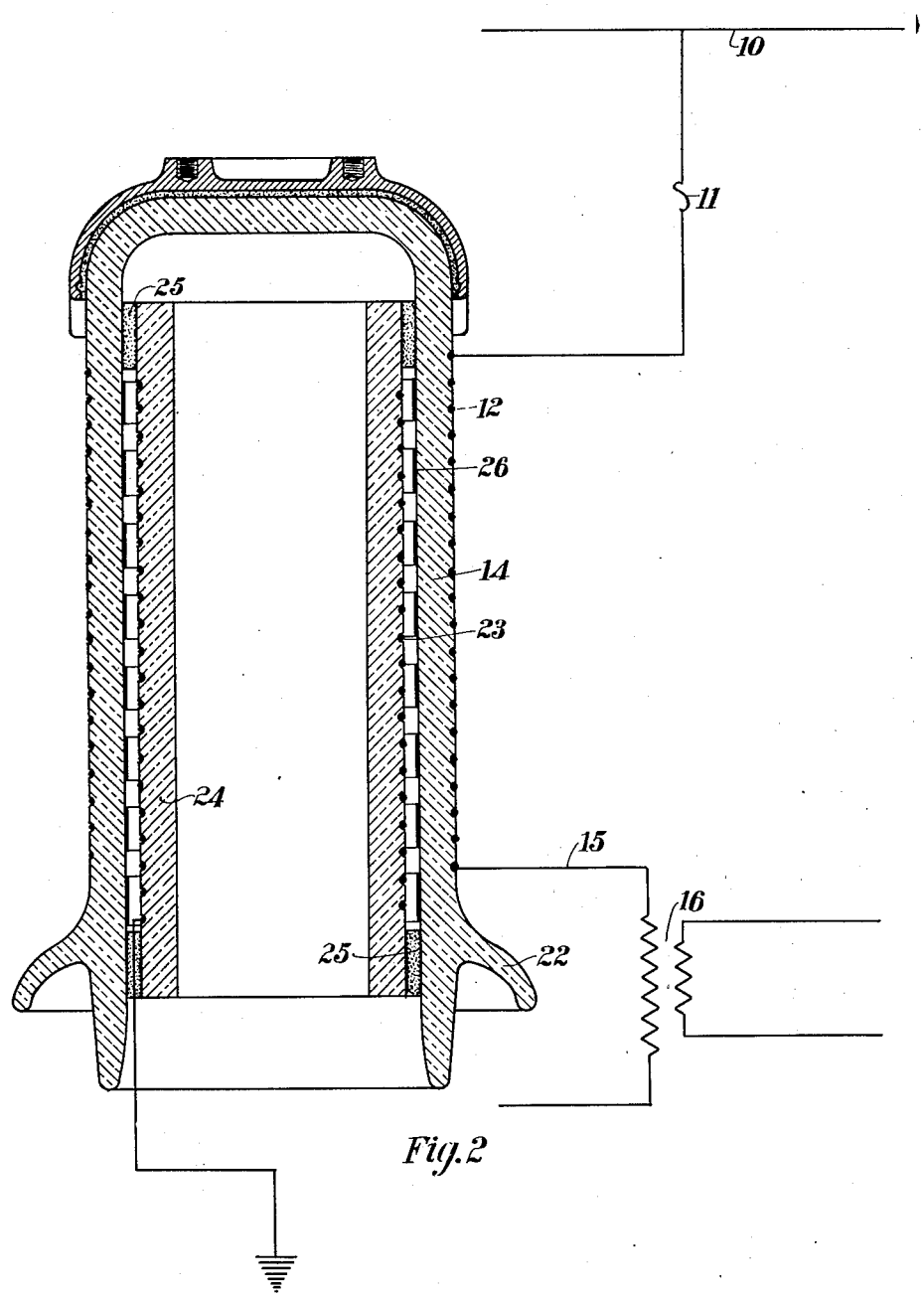
Fig. 2 is a view similar to Fig. 1 showing a modified form of the invention.

In the form of the invention shown in Fig. 2, the inner element of the condenser is formed by a resistance 23 wound upon the surface of a dielectric member 24, disposed inside of the member 14. The dielectric 24 may be secured in place by cement 25 or other suitable means. There is no connection with the upper end of the winding 23 but the lower end of the winding is connected to ground. It will be apparent that any current passing through the condenser will traverse the resistance 23 so that the resistance will act to dissipate the energy of the charge as well as provide a ground connection therefor.

In any lightning or surge protector depending upon electrostatic capacity, it is generally difficult to obtain a sufficient absorbing capacitance, and, at the same time, provide the necessary dielectric strength between the power circuit and the circuit to ground or other low potential body which charges the condenser.

In the present invention, a grading is obtained in the potential produced by the transient both in the outer and inner conductor elements of the condenser, which reduces the stress to which the dielectric is subjected and makes it possible to provide a cheaper and more efficient absorbing condenser. In order to provide a grading action to regulate the difference in potential across the dielectric member of the condenser, the coating or metallic conducting surface 13 of the condenser is split up into zones. These zones are connected, in turn, by resistances 20. When a surge or transient enters the winding 12 at the line side, current will tend to flow to the coating 13 through the ground lead and resistances 20. It is evident that this will produce an IR drop in the resistances 20 so that the condenser plate or coating 13 farthest from the ground connection will have an appreciable difference in potential from that of the ground and will tend to approximate the potential of the outside winding or condenser element 12. As the potentials of the adjacent coatings approach each other, the stress upon the dielectric forming the condenser will be reduced. As the charge flows along the winding 12, the potential will be reduced and, at the same time, the potential on the corresponding inner surface 13 forming the condenser will more nearly approach ground potential. From this it will be seen that a grading action is produced in the conductor element at each side of the dielectric which reduces the potential difference over the entire condenser to a value considerably less than the total difference between the line 10 and ground, thus permitting of more efficient surge or lightning protection. Another advantage of the arrangement is that where the conductor 12 has sufficient resistance and the resistances 20 connect the zones, the surge or transient will be dissipated in the winding 12 and in the resistances 20.

Another means of providing a material absorption of the energy of surges is a high resistance coating 13 instead of or supplementing the resistances 19 and 20 for either the entire coating or a part of it. This coating would then provide an energy dissipating means similar in action to the graphite receptacles used in induction furnaces. It is evident that the resistance elements of the condenser may be made in any suitable form and may be made of a series of rings with limited or control contact surfaces. The flow of current in a transient is very rapid and will induce appreciable potentials in an inner coating or winding, as stated above.

Where it is not desirable to use a high resistance coating for producing a dissipation of energy by the high frequency transformer action of the inner and outer condenser elements, the metalized surface 13 may have a gap or insulating member 17 between its ends. This metallic surface forming one plate of the condenser may be of any desirable form such as a metal coating described in my prior Patent No.

1,536,749 or it may be sheet metal or foil, or it may be in the form of a conducting winding. Where the condenser plate is provided with a gap, as shown at 17, this may be bridged with a suitable resistance 19 so that energy will be dissipated by the transformer action between the primary and secondary formed by the outer winding 12 and inner coating 13.

Dissipation of energy of a transient surge in the resistances 19 or in an inner layer 13 of resistance material, due to the transformer action, will be effective whether or not the secondary 13 is connected to ground. In general, however, where this action is depended upon without the connection to ground, it is necessary that there be an appreciable capacitance in the conductor 15 to ground or in the apparatus 16 so that current produced by the transient can flow through the winding 12 without producing a dangerous potential.

In the form of the invention shown in Fig. 2, the resistance drop in the secondary conductor 23 is such that the potential on the insulating member is reduced for a transient surge. If desired, this construction may be used in connection with dissipating resistances 26 which form the secondary of a transformer of which 12 is the primary. These resistances may be tied into the grading winding 23. If desired, the turns of the winding 23 may be shorted through resistances similar to the manner in which the zones are shorted in Fig. 1, or some of the turns may be shorted with a resistance, or resistance in the conductor may be depended upon to cause the necessary dissipation of energy. The lightning or surge arrester my take any suitable form, being enclosed in a metal tank, or oil immersed, if desired. The construction provides means for reducing the stress placed upon the dielectric by grading the potential in the conductor elements of the condenser. It also produces an energy dissipating transformer action with a portion of the current produced by the transient carried to ground and a portion absorbed by the capacitance between the primary and secondary. If desired, the lightning arresters or absorbers may be used in series or multiple or in combination with other protective devices.

I claim:

1. A surge arrester adapted to be interposed between a transmission line and a translating device, said surge arrester comprising a tubular, dielectric member, a resistance wound on the outer surface of said member and electrically connected in series between said line and device, and a conductor coating disposed on the inner surface of said tubular, dielectric member and separated into sections insulated from one another, and conductor paths having resistances therein electrically connecting said sections.

2. A surge arrester comprising a tubular, dielectric member having a resistance wound upon the outer surface thereof and adapted to be connected in series between a transmission line and a translating device, the inner surface of said tubular member being provided with a coating of conducting material, said coating being separated longitudinally and circumferentially of said dielectric member into sections insulated from one another, and resistance conductors connecting the separated sections, one of said sections being grounded.

3. A surge arrester comprising a tubular, dielectric member closed at the upper end and open at the lower end, a resistance wound upon the outer surface of said dielectric member and adapted to be connected in series between a transmission line and a translating device, the lower end of said tubular dielectric member extending beyond the resistance winding and having a flange thereon interposed between the resistance winding and the end of the dielectric member, a conductor coating on the inner surface of said tubular, dielectric member, longitudinal and circumferential ribs on said surface separating said coating into sections, resistance windings spanning said ribs and electrically connected with the sections on opposite sides of the respective ribs, one of said sections adjacent the lower end of said dielectric member being connected to ground.

4. In a condenser, a conductor element, means for electrically connecting spaced parts of said element to a transmission line and a translating device respectively, said element having appreciable resistance distributed therein in the path of current flowing from said line to said device, said resistance producing a potential gradient in said element when current flows from said line to said device, a second conductor element extending adjacent said first-named element, a dielectric separating said elements, means for grounding the part of said second-named element adjacent the part of said first-named element connected to said translating device, said second-named element having resistance wire of appreciable resistance distributed therein in the path of current flowing to ground through the grounded part of said second-named element and induced by the current in said first-named element, the resistance in said second-named element producing a voltage gradient in said second-named element when the current flowing to ground is induced therein, the voltage in said elements being graded in the same direction along said condenser when current flows from said line to said translating device, thus reducing the maximum voltage between adjacent portions of said elements to an amount materially less than the voltage difference between said line and ground.

ARTHUR O. AUSTIN.